United States Patent [19]

Nam

[11] Patent Number: 5,240,896
[45] Date of Patent: Aug. 31, 1993

[54] CATALYST COMPOSITION FOR IMPROVING COMBUSTION EFFICIENCY OF LIQUID FUELS

[76] Inventor: Young W. Nam, 410 Bon-Dong, Tongjak-Ku, Seoul, Rep. of Korea

[21] Appl. No.: 876,293

[22] Filed: Apr. 30, 1992

[51] Int. Cl.⁵ .................. B01J 27/18; B01J 27/182; B01J 27/185
[52] U.S. Cl. ................................................. 502/213
[58] Field of Search .......................... 502/213; 431/7

[56] References Cited

U.S. PATENT DOCUMENTS 4,047,876 9/1977 Rice ........................................ 431/7
4,749,671 6/1988 Saito et al. ...................... 502/213 X Primary Examiner—W. J. Shine
Attorney, Agent, or Firm—Birch, Stewart, Kolasch & Birch

[57] ABSTRACT

A solid ceramic liquid fuel catalyst contains silica ($SiO_2$) and alumina ($Al_2O_3$) as a main ingredient, and thorium oxide ($THO_2$), uranium oxide ($U_2O_3$), rare earth oxide (REO), iron oxide ($Fe_2O_3$), titanium oxide ($TiO_2$), calcium oxide (CaO), magnesium oxide (MgO), sodium oxide ($Na_2O$), potassium oxide ($K_2O$), and phosphorus pentoxide ($P_2O_5$).

2 Claims, 1 Drawing Sheet

CATALYST COMPOSITION FOR IMPROVING COMBUSTION EFFICIENCY OF LIQUID FUELS

BACKGROUND OF THE INVENTION

1. Field of the Invention

The present invention relates to a catalyst for improving the combustion efficiency of liquid fuels such as gasoline, light oil, petroleum, or heavy oil, and more particularly to a solid ceramic catalyst containing silica and alumina for use in liquid fuels as an additive.

2. Description of the Prior Art

Various types of liquid fuels such as gasoline, petrol, light oil, petroleum, or heavy oil generally used as a fuel for vehicles or various engines are in the art. Most typical liquid fuels do not burnt completely. Since the combustion of the fuel is incomplete, the heat efficiency is low, resulting in the waste of the fuel. Furthermore, pollutant gases such as carbon monoxide (CO) or hydrocarbon (HC) contained in the incompletely combusted gases have been the cause of the environmental pollution.

In order to eliminate such problems, various catalysts for complete combustion have been proposed, but no desirable results have been obtained.

SUMMARY OF THE INVENTION

Accordingly, it is an object of the present invention to provide a solid ceramic for use in liquid fuels as a catalyst, having combustion efficiency and preventing the waste of fuels, which eliminates the above problems encountered with conventional liquid fuel additives.

Another object of the present invention is to provide a solid ceramic catalyst to be added to liquid fuels, which is effective in reducing pollution and prevents environmental pollution.

A further object of the present invention is to provide a solid ceramic catalyst for use as a lubricant, which is effective in preventing the oxidization of engine oil or lubricating oil.

Still another object of the present invention is to provide a solid ceramic catalyst effective in detoxifying, disinfecting or preventing from becoming rotten drinking waters or food when the catalyst is used as a certain ratio of composition.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a solid ceramic liquid fuel catalyst containing silica ($SiO_2$) and alumina ($Al_2O_3$) as a main ingredient, and thorium oxide ($ThO_2$), uranium oxide ($U_2O_3$), rare earth oxide (REO), iron oxide ($Fe_2O_3$), titanium oxide ($TiO_2$), calcium oxide (CaO), magnesium oxide (MgO), sodium oxide ($Na_2O$), potassium oxide ($K_2O$), and phosphorus pentoxide ($P_2O_5$).

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1A:
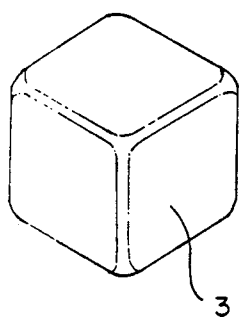
FIGS. 1A, 1B, and 1C show the solid ceramic liquid fuel catalyst of the present invention.
Figure 1B:
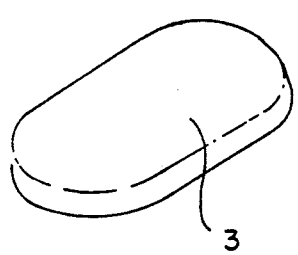
Figure 1C:
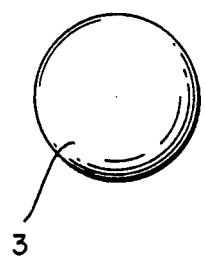
Figure 2:
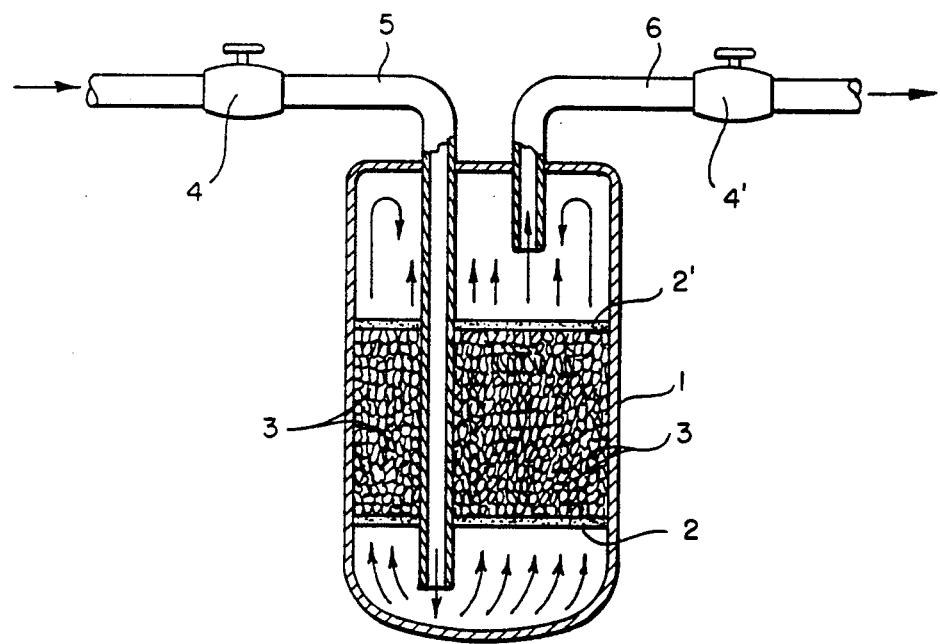
FIG. 2 is a sectional view of the solid ceramic liquid fuel catalyst of the present invention.

Referring now in detail to the drawings for the purpose of illustrating preferred embodiments of the present invention, the solid ceramic liquid fuel catalyst as shown in FIGS. 1 and 2, comprises an ore mixture containing 50.85% by weight of silica ($SiO_2$) and 28.69% by weight alumina ($Al_2O_3$) as a main ingredient. The ore mixture further contains 1.27% by weight of thorium oxide ($ThO_2$), 0.03% by weight of uranium oxide ($U_2O_3$), 5.44% by weiqht of rare earth oxide (REO), 0.89% by weight of iron oxide ($Fe_2O_3$), 0.05% by weight of titanium oxide ($TiO_2$), 0.61% by weight of calcium oxide (CaO), 0.06% by weight of magnesium oxide (MgO), 1.98% by weight of sodium oxide ($Na_2O$), 4.18% by weight of potassium oxide ($k_2O$), and 4.99% by weight of phosphorus pentoxide ($P_2O_5$). The above described ore mixture is kneaded into the desired types of shapes shown in FIG. 1, and the formed paste is calcinated at 1,250°– 1,300° C. Therefore, a solid ceramic catalyst of the present invention is obtained.

When 180 g of the obtained solid ceramic catalyst according to the present invention is added to 50 l of a conventional liquid fuel in a vehicle fuel tank for a running test, a fuel saving of 10–20% is obtained, carbon monoxide in the exhaust gas is not detected, compared with the conventional exhaust gas containing 0.1–0.002% of carbon monoxide, and the hydrocarbon in the exhaust gas is reduced by 50%.

The solid ceramic catalyst of the present invention contains silica ($SiO_2$) and alumina ($Al_2O_3$) as a major ingredient and other ingredients such as thorium oxide ($ThO_2$) and the like. Upon contact of the solid ceramic contact with a liquid fuel, the combustion of the liquid fuel is accelerated, and a saving of fuel is accomplished. Furthermore, pollutant materials in the exhaust gas may be eliminated or decreased.

To utilize the solid ceramic catalyst of the present invention effectively, a passage device may be provided as shown in FIG. 2. In FIG. 2, an outer case 1 is provided with upper and lower filter nets 2 and 2'. The solid ceramic 3 of the present invention is inserted in the interior of the case 1. An inflow tube 5 and a discharge tube 6 are respectively provided with opening and closing valves 4 and 4'. Therefore, the passage device allows the liquid fuel to pass and contact the solid ceramic 3.

In addition, the solid ceramic catalyst of the present invention can be used as a preventative agent against the oxidization of engine oil or lubricating oil, thus bringing about a lubrication effect.

Also, the solid ceramic catalyst of the present invention can be used as a detoxication, disinfection and rottenness prevention agent for potable waters or food. The mixing rate of the ingredient of the solid ceramic catalyst of the present invention may be changed, for example, and the rate of silica ($SiO_2$) is raised while that of the rare earth oxide (REO) is lowered.

Accordingly, the solid ceramic catalyst of the present invention serves as a catalyst for improving the combustion efficiency of various liquid fuels, thus preventing environmental pollution. Furthermore, the solid ceramic catalyst of the present invention is effective in detoxifying and maintaining the freshness of various foods.

The present invention will now be described in more detail in connection with the following example which should be considered as being exemplary and not limiting the present invention.

EXAMPLE

An ore mixture in the powder state contains silica and alumina as its major constituents and was obtained by mixing the following constituents in the ratio of the following wt %:

| Constituents | wt % |
|---|---|
| silica ($SiO_2$) | 50.85 |
| alumina ($Al_2O_3$) | 28.69 |
| thorium oxide ($ThO_2$) | 1.27 |
| uranium oxide ($U_2O_3$) | 0.03 |
| rare earth oxide (REO) | 5.44 |
| iron oxide ($Fe_2O_3$) | 0.89 |
| titanium oxide ($TiO_2$) | 0.05 |
| calcium oxide (CaO) | 0.61 |
| magnesium oxide (MgO) | 0.06 |
| sodium oxide ($Na_2O$) | 1.98 |
| potassium oxide ($K_2O$) | 4.18 |
| phosphorus pentoxide ($P_2O_5$) | 4.99 |

Water was added to this mixture in the same way as when preparing a conventional ceramic. The resulting mixture was kneaded to form a solid body of any shape as shown in FIG. 1. The solid body was calcined at 1250° to 1300° C. so that a solid ceramic catalyst of the present invention was obtained.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A solid ceramic catalyst for improving the combustion efficiency of liquid fuels, comprising: silica and alumina as a major ingredients and containing thorium oxide, uranium oxide ($U_2O_3$), rare earth oxide, iron oxide ($Fe_2O_3$), titanium oxide ($TiO_2$), calcium oxide, magnesium oxide, sodium oxide, potassium oxide, and phosphorus pentoxide.

2. The solid ceramic catalyst of claim 1, wherein said silica is present in an amount of 50.85% by weight, alumina is present in an amount of 28.69% by weight, thorium oxide is present in an amount of 1.27% by weight, uranium oxide is present in an amount of 0.03% by weight, rare earth oxide is present in an amount of 5.44% by weight, iron oxide is present in amount of 0.89% by weight, titanium oxide is present in an amount of 0.05% by weight, calcium oxide is present in an amount of 0.61% by weight, magnesium oxide is present in an amount of 0.06% by weight, sodium oxide is present in an amount of 1.98% by weight, potassium oxide is present in an amount of 4.18% by weight, and phosphorus pentoxide is present in an amount of 4.99% by weight.

* * * * *